Sept. 20, 1949.  R. E. BAYLESS  2,482,535
COUNTER-SINKING TOOL
Filed May 4, 1946
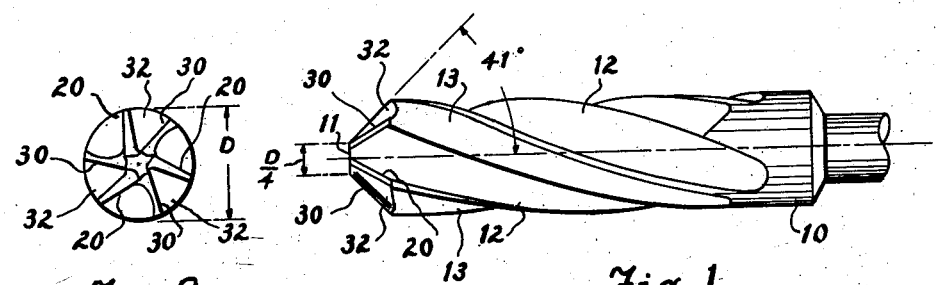
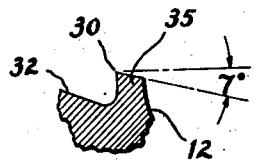
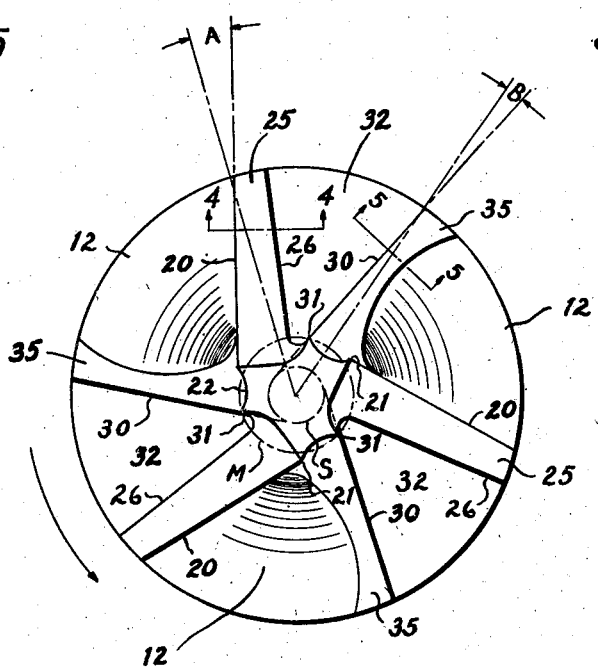
INVENTOR
RUSSELL E. BAYLESS
BY
Spencer Hardman & Jehr
HIS ATTORNEYS Patented Sept. 20, 1949

2,482,535

UNITED STATES PATENT OFFICE 2,482,535

COUNTERSINKING TOOL

Russell E. Bayless, Dayton, Ohio, assignor to General Motors Corporation, Detroit, Mich., a corporation of Delaware Application May 4, 1946, Serial No. 667,396

5 Claims. (Cl. 77—73.5)

1

This invention relates to a counter-sinking tool to be used for cutting a chamfered or other enlargement in the upper part of a hole, usually for the reception of the head of a bolt, screw or rivet wholly or partly below the surface.

Various forms of counter-sinking tools are now well known, but certain difficulties are experienced in their use. Many such prior tools are subject to vibration and chattering and have to be run at quite low speeds in order to avoid excessive chattering and jumping around of the tool relative to the center line of the hole being countersunk.

An object of this invention is to provide a pilotless counter-sinking tool which may be run at relative high speeds without chattering or tending to jump off center and which will make a smooth even cut without throwing up rough edges or burrs at either the inner or outer diameter of the cut.

An object is to provide a counter-sinking tool having a series of cutting edges each of which extends at an angle to the radial direction when looking axially at the end of the tool. Due to this feature all parts of the length of said cutting edges move at a substantial angle to the direction of said edges rather than in a direction perpendicular thereto and thereby greatly facilitates the cutting operation.

Another object is to provide such a countersinking tool having a series of cutting edges some of which extend at one angle to the radial direction while the alternate cutting edges extend at a different angle to the radial direction, when looking axially at the end of the tool. Due to this feature each cutting edge cuts thru the work at a slight angle to the cut made by the immediately preceding cutting edge, hence if any slight ridge or depression of any sort happens to be made in the work by one cutting edge the next succeeding cutting edge will not match up in direction with such ridge or depression and thereby tend to cause the entire tool to jump or chatter. But said next succeeding cutting edge will move against such ridge or depression at a slight angle thereto and hence provide a smooth non-chattering cut.

Further objects and advantages of the present invention will be apparent from the following description, reference being had to the accompanying drawings wherein a preferred embodiment of the present invention is clearly shown.

In the drawings:

Fig. 1 is a side elevation of a counter-sinking tool made according to this invention.

Fig. 2 is an end view of Fig. 1.

2

Fig. 3 is a greatly enlarged view of Fig. 2 showing how the alternate cutting edges extend in different directions relative to the radial direction when looking axially at the end of the tool.

Fig. 4 is a section on line 4—4 of Fig. 3 and shows the sectional shape of the three main cutting edges of the tool.

Fig. 5 is a section on line 5—5 of Fig. 3 and shows the sectional shape of the three secondary cutting edges of the tool.

Similar reference characters refer to similar parts throughout the several views.

The tool of this invention may be made from fluted core drills of the desired diameter, or this tool may be made from solid round tool steel stock and the main and secondary teeth cut therein as described hereinbelow.

In making the counter-sinking tool shown in the drawings, the metal of the core drill stock 10 having a diameter D is first circular ground to a right cone having the desired angle, shown in Fig. 1 as 82°. Next the end of the tool is ground off at 90° to the center line to provide a flat end surface 11 having a diametral dimension approximately one-fourth that of the core drill stock. Then the three main cutting edges 20 are ground to points 21 so that, when viewing the end of the tool axially (as viewed in Fig. 3), said main cutting edges 20 will extend along lines tangent to a circle M whose diameter is approximately one-fourth of the outer diameter D of the tool. That is, the main cutting edges 20 do not extend in a radial direction but extend at the substantial angle "A" to a radial line drawn thru the axis of the tool (as projected in Fig. 3).

Then the secondary cutting edges 30, which terminate at points 31 in end surface 11, are ground in the original lands 13 by grinding open recesses 32 in the conical end surfaces of said lands 13. According to this invention these secondary cutting edges 30 are so cut that they will extend at a substantially different angle from the main cutting edges 20 relative to the radius (as projected in Fig. 3). In Fig. 3, these secondary edges 30 extend on lines tangent to a circle S whose diameter is approximately one-eighth of the outer diameter D of the tool. That is, the secondary edges 30 extend at an angle "B" to a radial line drawn thru the axis of the tool (as projected in Fig. 3). An important feature of this invention is the substantial difference between angle A and angle B. This feature causes each cutting edge to cut thru the work at an angle different from that of the immediately preceding cutting edge, with the resultant advantages described above. The sizes of angles A and B depend upon the radii of circles M and S, respectively. In Fig. 3, since the radius of circle S is one-half that of circle M, angle B will be practically one-half of angle A.

The above-mentioned open recesses 32 are cut in the conical end surfaces of lands 13 to form the secondary teeth 35. These open recesses 32 are cut to a sufficient depth below the cutting edges 30 to provide suitable open space for the metal chips removed in use by said cutting edges 30. The trailing top surfaces of the secondary teeth 35 are ground back from their cutting edges 30 at an angle of about 7° as shown in Fig. 5. Likewise the trailing top surfaces of the main teeth 25 are ground back from their cutting edges 20 at an angle of about 7° for a suitable width, as shown by lines 26 in Fig. 3 and by point 26 in Fig. 4.

The open recesses 32 are cut out at a somewhat steeper angle than 7 degrees immediately trailing the lines 26 in order to provide the desired height to the secondary teeth 35. Preferably the leading faces of the secondary teeth 35 are slightly undercut below the cutting edge 30, as shown in Fig. 5, but this is optional. Since the leading faces of main teeth 25 are formed for the most part by the adjacent spiral surfaces of grooves 12 (except at their inner ends near points 21) these leading faces will be undercut as shown in Fig. 4.

After the teeth 25 and 35 are cut as described above, as a final operation the end of the tool is again circular ground to a true right cone of the desired angle so as to bring all the cutting edges 20 and 30 exactly into said conical surface.

In operation, the above-described tool is used to cut a counter-sink in a previously made hole at least as large as the diametral dimension of the flat end 11 of the tool, so that said flat end will not abut the top of the hole. As the tool is rotated in the direction of the arrow in Fig. 3, against the metal to be cut away the main cutting edges 20 and the secondary cutting edges 30 follow each other alternately. If at any time one of these cutting edges 20 should leave any sort of slight ridge or valley in the metal being cut away, the next succeeding cutting edge will strike such slight ridge or valley at a different angle, that is, said succeeding cutting edge will not match up in direction with such ridge or valley but will engage same progressively from end to end thereof. This will avoid any sudden increase or decrease in the load applied to said succeeding cutting edge which would tend to cause the tool to vibrate or chatter.

In prior countersinking tools all the cutting edges move against the metal being cut away at the same angle. Now if such a tool should vibrate or jump slightly due to encountering a hard spot in the work or for any other reason, each of the cutting edges would leave a slight ridge in the work, and thereafter the cutting edges would each engage one of these ridges at the same time. This will cause the tool to continue to jump or chatter because of such synchronization and because each cutting edge will match up in direction with such ridges. The tool of this invention overcomes such tendency to jump and chatter due to the following several features thereof.

First, the alternate cutting edges strike the metal to be cut away at different angles, due to the difference between angle A and angle B as viewed in Fig. 3.

Second, the six cutting edges are not evenly spaced peripherally around the tool, hence there will be no synchronization of all the cutting edges striking previously formed ridges in the work at the same time.

Third, both the main cutting edges 20 and the secondary cutting edges 30 extend inwardly, at a substantial angle ahead of a radial line as viewed in Fig. 3. This means that all of said cutting edges move against the work at a substantial angle to said edges rather than in a direction perpendicular to said edges. This results in a slicing action by all the cutting edges, which of course facilitates the cutting and aids especially in preventing the throwing up of rough edges or burrs at either the inner or outer diameter of the cut.

The above features coacting together cause this counter-sinking tool to cut smoothly at a much higher operating speed without chattering or tending to vibrate out of alignment as prior countersinking tools do when run at such speeds. Also this tool eliminates the necessity of a subsequent burring operation on the cuts made thereby. This tool will cut smoothly even when used to countersink a hole so closely adjacent a second hole or opening in the work that the cut made by the tool extends into said second hole or opening.

The tool described in detail hereinabove is made from a three-fluted core drill and the finished tool has six cutting teeth. It is to be understood that the principles of this invention can also be applied in making a finished tool having more or less than six cutting teeth. Tools of larger diameters have sufficient conical areas for conveniently making a larger number of teeth thereon according to this invention than do tools of smaller diameters.

While the embodiments of the present invention as herein disclosed, constitute preferred forms, it is to be understood that other forms might be adapted, all coming within the scope of the claims which follow.

What is claimed is as follows:

1. A rotary counter-sinking tool having a series of main cutting edges and a series of secondary cutting edges all lying in a geometrical cone, each of said main cutting edges lying at a predetermined angle to the right line of generation of said cone, each of said secondary cutting edges lying at a predetermined angle to the right line of generation of said cone, said predetermined angle of said main edges being substantially greater than said predetermined angle of said secondary edges, all of said cutting edges having their inner ends inclined forwardly relative to the direction of rotation of said tool.

2. A rotary counter-sinking tool having a series of more than two cutting edges all lying in a geometrical cone generated by the rotation of a right line about the tool axis, said cutting edges being unevenly spaced peripherally around the tool so as to avoid synchronization of all said cutting edges striking previously formed ridges in the work at the same time, each of said cutting edges extending in a direction at a substantial angle to the right line of generation of said cone, all of said cutting edges having their inner ends inclined forwardly relative to the direction of rotation of said tool.

3. A rotary counter-sinking tool having a series of main cutting edges and a series of secondary cutting edges all lying in a geometrical cone generated by the rotation of a right line about the tool axis, each of said main cutting edges lying at a predetermined angle to said right line, each of said secondary cutting edges lying at a substantially smaller predetermined angle to said right line, said main cutting edges being alternately arranged around the cone with said secondary cutting edges.

4. A rotary counter-sinking tool having a series of main cutting edges and a series of secondary cutting edges all lying in a geometrical cone generated by the rotation of a right line about the tool axis, each of said main cutting edges lying at a predetermined angle to said right line, each of said secondary cutting edges lying at a substantially different predetermined angle to said right line, all of said cutting edges having their inner ends inclined forwardly relative to the direction of rotation of said tool.

5. A rotary counter-sinking tool having a series of main cutting edges and a series of secondary cutting edges all lying in a geometrical cone generated by the rotation of a right line about the tool axis, each of said main cutting edges lying at a predetermined angle to said right line, each of said secondary cutting edges lying at an angle to said right line which is approximately half that of said main cutting edges, all of said cutting edges having their inner ends inclined forwardly relative to the direction of rotation of said tool.

R. E. BAYLESS.

REFERENCES CITED

The following references are of record in the file of this patent:

UNITED STATES PATENTS

| Number | Name | Date |
| --- | --- | --- |
| 1,467,491 | Oliver | Sept. 11, 1923 |
| 2,401,307 | Manewich | June 4, 1946 |